(12) United States Patent
Langlois

(10) Patent No.: US 9,004,897 B2
(45) Date of Patent: Apr. 14, 2015

(54) MOULD BASE SUPPORT

(75) Inventor: Jean-Christophe Langlois, Octeville-sur-Mer (FR)

(73) Assignee: Sidel Participations, Octeville sur Mer (FR)

( * ) Notice: Subject to any disclaimer, the term of this patent is extended or adjusted under 35 U.S.C. 154(b) by 61 days.

(21) Appl. No.: 13/881,343

(22) PCT Filed: Oct. 26, 2011

(86) PCT No.: PCT/FR2011/052496
§ 371 (c)(1),
(2), (4) Date: Apr. 24, 2013

(87) PCT Pub. No.: WO2012/056168
PCT Pub. Date: May 3, 2012

(65) Prior Publication Data
US 2013/0224325 A1    Aug. 29, 2013

(30) Foreign Application Priority Data

Oct. 26, 2010 (FR) .................................. 10 58787

(51) Int. Cl.
| B29C 49/48 | (2006.01) |
| B29C 33/30 | (2006.01) |
| B29C 49/54 | (2006.01) |
| B29C 49/06 | (2006.01) |
| B29C 49/70 | (2006.01) |
| B29L 31/00 | (2006.01) |

(52) U.S. Cl.
CPC ................ B29C 49/48 (2013.01); *B29C 49/06* (2013.01); *B29C 49/4823* (2013.01); B29C 49/541 (2013.01); *B29C 49/70* (2013.01); *B29C 2049/4843* (2013.01); *B29C 2049/4848* (2013.01); *B29C 2049/4892* (2013.01); *B29C 2049/546* (2013.01); *B29C 2049/702* (2013.01); *B29L 2031/7158* (2013.01)

(58) Field of Classification Search
CPC ................ B29C 33/306; B29C 49/30; B29C 2049/4858; B29C 2049/4892
USPC ................ 425/182, 522, 525, 541
See application file for complete search history.

(56) References Cited

U.S. PATENT DOCUMENTS 3,843,286 A * 10/1974 Horberg et al. ............... 425/526
5,785,921 A    7/1998 Outreman et al.

(Continued)

FOREIGN PATENT DOCUMENTS

FR    2 714 631 A1    7/1995
FR    2 833 872 A1    6/2003

(Continued)

*Primary Examiner* — Robert B Davis
(74) *Attorney, Agent, or Firm* — Sughrue Mion, PLLC

(57) ABSTRACT

The support cooperates with the half-molds (2, 3) of a molding unit used to shape a container from thermoplastic material. This support comprises: a pedestal in the form of an actuating cylinder (11), the rod (12) of which is solidly connected to the mold base (1); and, between the rod (12) of the actuating cylinder (11) and the mold base (1), an assembly system (13) formed by a female part in the form of a nut (14) and of a male part in the form of a screw (15). The nut (14) is trapped at the end of the rod (12) of the actuating cylinder (11) and the screw (15) is associated directly or indirectly with the mold base (1). A system of shim(s) (40, 41) can be used to adjust the working stroke of the rod (12) of the actuating cylinder (11) as required.

21 Claims, 2 Drawing Sheets

(56) References Cited

U.S. PATENT DOCUMENTS

| | | | |
|---|---|---|---|
| 7,381,045 B2 * | 6/2008 | Fields et al. | 425/182 |
| 8,057,210 B2 * | 11/2011 | Clark | 425/182 |
| 8,292,612 B2 * | 10/2012 | Langlois | 425/525 |
| 2003/0150586 A1 | 8/2003 | Matsuura et al. | |
| 2004/0070119 A1 | 4/2004 | Fibbia et al. | |
| 2008/0283533 A1 | 11/2008 | Tilton et al. | |
| 2011/0018177 A1 | 1/2011 | Goss et al. | |
| 2011/0129558 A1 * | 6/2011 | Langlois | 425/182 |

FOREIGN PATENT DOCUMENTS

| WO | 02/062549 A2 | 8/2002 |
|---|---|---|
| WO | 2007/082051 A1 | 7/2007 |
| WO | 2010/130940 A1 | 11/2010 |

* cited by examiner

MOULD BASE SUPPORT

CROSS REFERENCE TO RELATED APPLICATIONS

This application is a National Stage of International Application No. PCT/FR2011/052496, filed on Oct. 26, 2011, which claims priority from French Patent Application No. 10 58787, filed on Oct. 26, 2010, the contents of all of which are incorporated herein by reference in their entirety.

The invention relates to an improvement to a mould base support, and in particular a mould base which is used in cooperation with half-moulds for making containers of thermoplastic material, bottles, or the like. It more specifically concerns the support for the moulding portion of the mould base.

BACKGROUND OF THE INVENTION

The mould base support generally comprises two parts which are solidly attached to each other by appropriate means:—a pedestal to which is attached said mould base, and—a carriage to which said pedestal is removably attached.

The carriage is connected to the frame, or bracket, of the mould carrier unit by guide means which allow it to move vertically between two positions. The carriage can in effect move, relative to the two half-moulds, between an active position which allows performing the container moulding operation and an inactive position where it is retracted relative to said half-moulds, which allows the removal of the moulded container from the moulding unit.

The pedestal of the mould base may, as described in document FR 2 714 631, be in the form of an actuating cylinder, said actuating cylinder moving said mould base in order to perform a bottle moulding operation according to the "boxing" method.

Document U.S. 2008/283533 also describes a unit for moulding a container.

SUMMARY OF THE INVENTION

The present invention first proposes a means for connecting the pedestal to the mould base and, in particular, in the case of a pedestal in the form of an actuating cylinder, the invention proposes means for assembling the mould base directly or indirectly on the end of the rod of the actuating cylinder which allows maneuvering said mould base. The invention proposes an assembly means of this type that is more practical to apply.

This original arrangement of the mould base support and in particular the presence of this means of assembling said mould base on the end of the actuating cylinder, also allows providing and installing means which offer the possibility of adjusting the stroke of the actuating cylinder according to requirements, in a manner that controls this stroke. By limiting this stroke to what is strictly necessary, the cycle times are significantly improved, particularly the cycle time related to this boxing operation.

Thus, in the invention, the support for the moulding portion of a mould base is part of a mould carrier unit and it cooperates with the half-moulds to shape the container of thermoplastic material, and this support comprises:
 a pedestal in the form of an actuating cylinder, active or not, in which the rod is solidly connected to said mould base and in which the body can be locked onto the half-moulds of said mould carrier unit,
 a carriage placed between said actuating cylinder and the bracket of said mould carrier unit,
 said support comprising, between said rod of the actuating cylinder and said mould base, an assembly system consisting of a female part in the form of a nut, and a male part in the form of a screw.

In a preferred arrangement of the invention, the screw is associated directly or indirectly with the mould base.

In one arrangement of the invention, the screw is rotationally locked relative to the end of the rod by means of a pin which is placed between the screw and the end of the rod.

In one arrangement of the invention, the end of the rod of the actuating cylinder comprises means for centering and immobilizing the male part of the assembly system, said means comprising—a protruding annular ring and—an off-centered locking pin, said male part comprising a circular groove cooperating with the inside surface of said ring and an opening arranged in an manner appropriate for cooperating with said pin. This arrangement has the advantage of improving the convenience of the assembly of the actuating cylinder rod relative to the mould base. The nut is easy to access because it surrounds the screw. In addition, as the nut is angularly immobilized relative to the rod of the actuating cylinder due to the off-centered pin, the rotation of the nut relative to the rod of the actuating cylinder tightens or loosens the screw with only one hand required.

In one arrangement of the invention, the support comprises a wear ring which is solidly connected to the body of the actuating cylinder and forms, with the exit wall of the rod of the actuating cylinder, a recess which serves to house the assembly system when said rod of the actuating cylinder is in the retracted position. The space which extends between said wear ring and a shoulder arranged on the male part of the assembly system is arranged to accept a system of shim(s) which allows adjusting the working stroke of said rod of the actuating cylinder according to requirements.

Still according to the invention, the system of shim(s) comprises:
 a shim in washer form, arranged for attachment to the wear ring so as to add additional thickness, and
 a shim arranged for attachment to a shoulder of the male part of the assembly system.

In one arrangement of the invention, one of the shims acts as a damping washer or pad, said shim being made of a polyurethane-type material and being attached by screw, for example, to the shoulder of the male part of the assembly system.

In one variant, the screw constituting the male part of the assembly system is formed directly on the free surface of the mould base.

In another variant, the screw constituting the male part of the assembly system is formed on a sole plate which acts as an interface between said male part and, depending on the case, the mould base or a spacer which is placed between said sole plate and said mould base.

Still according to the invention, the sole plate which acts as an interface comprises arrangements in the form of channels, for distributing a heat transfer fluid into the mould base as well as, for example, air to assist with unmoulding.

Advantageously, the nut is a captive nut at the end of the rod of the actuating cylinder.

Advantageously, the support comprises a shim system arranged between a ring solidly connected to the body of the actuating cylinder and a spacer solidly connected to the mould base.

In another preferred arrangement of the invention, the male part which constitutes the screw of the assembly system comprises a collar which extends around said screw, said collar being arranged to accept a washer, of a "Nylon"-type material, which is placed between said collar and the nut in order to act as a locking washer.

Still according to the invention, the washer is preferably solidly connected to the collar of the male part, meaning to the mould base, or, depending on the case, to the sole plate which is associated with said mould base or which is associated with the spacer.

In another aspect, the invention relates to a sub-assembly of a moulding unit for forming a container of thermoplastic material, comprising a mould base including the moulding portion of the moulding unit intended for moulding the base of the container, and a support as mentioned above.

BRIEF INTRODUCTION OF DRAWINGS

The invention is detailed in a sufficiently clear and complete manner in the following description to enable its execution, which is also accompanied by drawings in which.

DETAILED DESCRIPTION OF THE PREFERRED EMBODIMENTS

Figure 1:
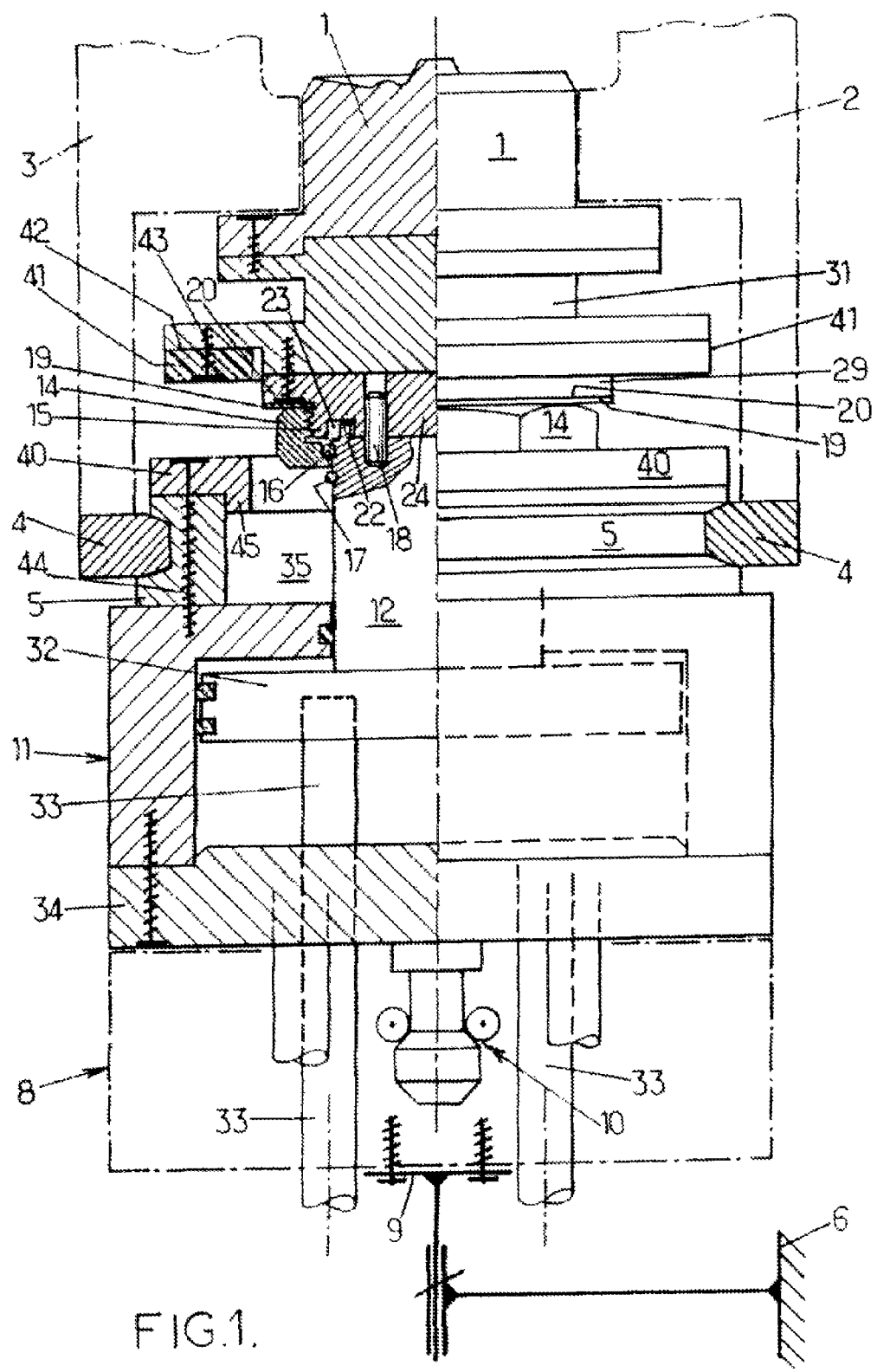
FIG. 1 shows a support according to the invention, represented in two half-views: a schematic half-view on the right and a cross-sectional half-view on the left.

FIG. 1 shows a schematic and simplified view of a support for a mould base 1, said base 1 being part of a moulding unit which comprises two half-moulds 2 and 3, said half-moulds cooperating, by means of clamps 4, with a ring 5 which is commonly called a wear ring. This ring 5 allows locking the support onto the half-moulds 2 and 3 in order to perform the stretch-blow moulding operation on a preform so as to transform it into a container such as a bottle, flask, or the like.

This assembly, consisting of the half-moulds 2 and 3 and the support, forms what is called the moulding unit. This moulding unit comprises a bracket 6 on which the half-moulds 2 and 3 are hinged and on which the mould base 1 support is installed.

This mould base 1 support is placed on a carriage 8 which is connected to the bracket 6, or frame, by means of a support plate 9. This support plate 9 can move vertically between an active position which corresponds to closing the mould and which allows the moulding operation, and an inactive position which corresponds to opening said mould and which allows removing the bottle, for example.

The carriage 8, represented with a dot-and-dash line, comprises quick assembly means 10 which can accept a pedestal, said pedestal having the form of an actuating cylinder 11 as described in the French patent mentioned above, and the rod 12 of this actuating cylinder 11 is connected either directly, or indirectly as is the case in FIG. 1, to the mould base 1.

This connection between the end of the rod 12 of the actuating cylinder 11 and the mould base 1 is achieved by means of an assembly system which comprises a female part consisting of a nut 14 and a male part consisting of a screw 15; this assembly system allows a rapid and particularly convenient assembly and disassembly with said mould base 1, according to requirements.

Preferably, the nut 14 is installed onto the end of the rod 12 of the actuating cylinder 11; it is locked onto this rod 12 by means of a circlip-type retainer 16, which fits within a semi-circular groove arranged towards the end of said rod 12, and it is held translationally immobile by means of a part 17 in the form of an elastic sealing ring which is also positioned in a semi-circular groove, located on said rod 12, under the groove that accepts said retaining clip 16.

Figure 3:
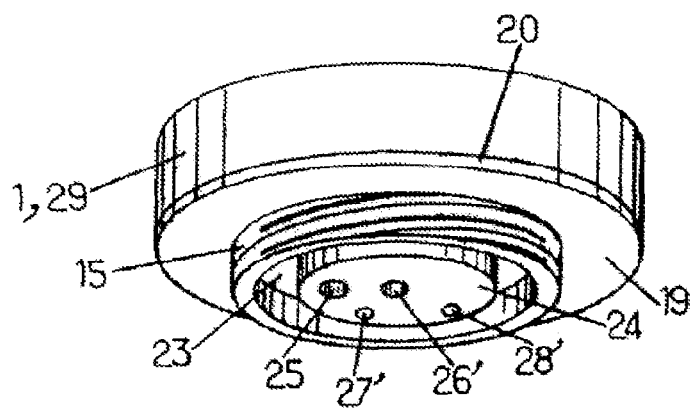
FIG. 3 represents another partial view, showing the male part of the assembly system, as arranged on the mould base or on a sole plate which acts as an interface, for example.
Figure 2:
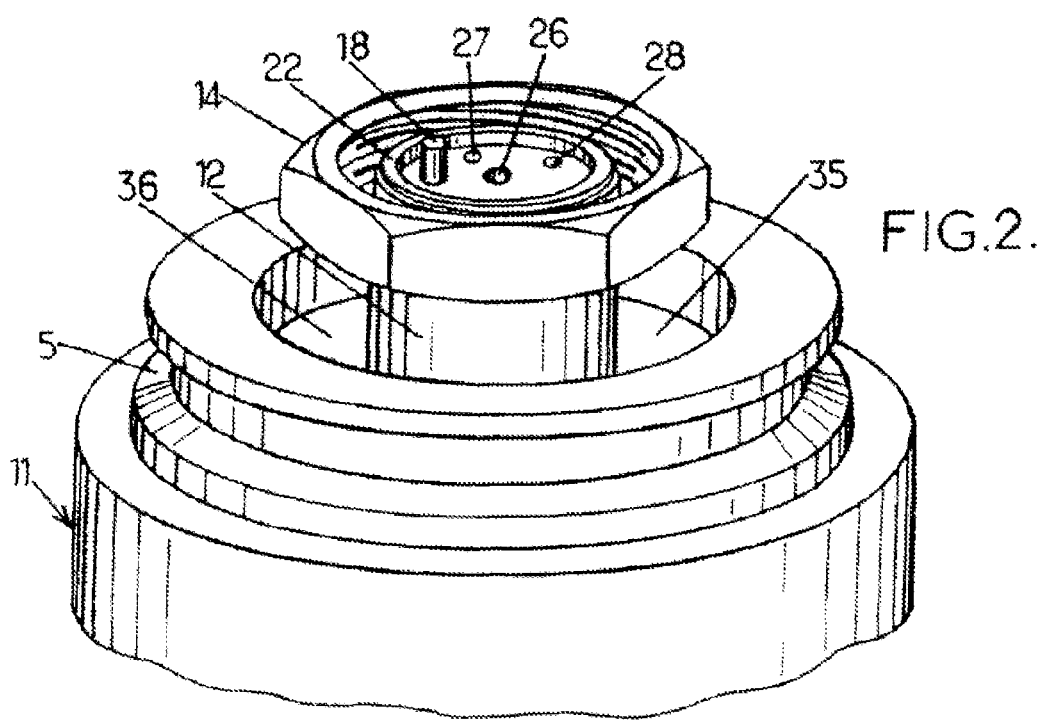
FIG. 2 represents a partial perspective view of the pedestal in the form of an actuating cylinder, said actuating cylinder comprising, on the end of its rod, the female part of the assembly system which connects the mould base to the end of said rod of the actuating cylinder.

The details of the alignment of the screw 15 relative to the end of the rod 12 of the actuating cylinder 11 and the details of the rotational locking of this screw are also apparent in FIGS. 2 and 3. The rotational locking of the screw 15 relative to the end of the rod 12 occurs by means of a pin 18 placed between the two.

The immobilization of the nut 14 relative to the male part which comprises the screw 15 is achieved by means of a locking washer 19 of appropriate "Nylon"-type material. This washer 19 is placed between the nut 14 and a collar 20 arranged on the male part which comprises the screw 15, around this screw 15. This washer 19 is flexible enough not to interfere when directly tightening the screw 15 onto the end of the rod 12 of the actuating cylinder 11.

As represented in a more detailed perspective view in FIGS. 2 and 3, the nut 14 is installed at the end of the rod 12 of the actuating cylinder 11 and this end comprises an annular ring 22 for aligning the male part which comprises the screw 15, said male part including a circular groove 23 and the central stump 24 of this male part fitting within said ring 22. The alignment of the male part on the end of the rod 12 of the actuating cylinder occurs on the inside surface of the ring 22.

The positional indexing of the male part comprising the screw 15, and in particular the indexing of the mould base 1 relative to the end of the rod 12 of the actuating cylinder 11, is achieved by means of the pin 18, said pin 18 being installed on the end of the said rod 12 and cooperating with a bore hole 25 made in the stump 24 of said male part.

In these FIGS. 2 and 3, one will note a central opening located at the end of the rod 12 of the actuating cylinder 11. This central opening 26 allows, for example, supplying compressed air to assist with unmoulding the container, meaning with detaching the base of said container from the mould base 1. Two other openings 27 and 28 allow, for example, the entry and exit of a heat transfer fluid whose role is to maintain the mould base 1 at an appropriate temperature for performing the moulding operation and/or the boxing operation, depending on the case.

Figure 4:
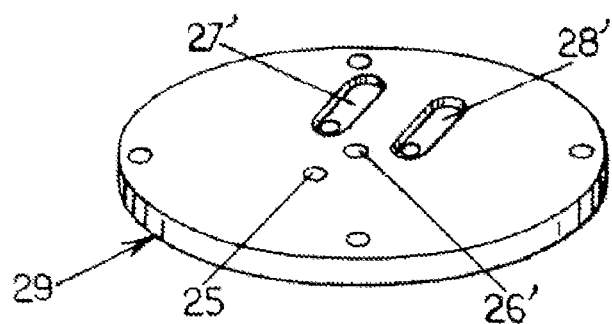
FIG. 4 represents a perspective view of a sole plate, and shows its surface which is arranged to accept different types of mould bases including a mould base which in particular can receive a heat transfer fluid.

These openings are found on the male part constituting the screw 15; said male part may also include, as represented in FIG. 4, a sole plate 29 acting as an interface between the rod 12 of the actuating cylinder and the mould base 1. This sole plate 29 comprises arrangements 27' and 28' in the form of channels which allow distributing the heat transfer fluid into channels arranged on the mould base 1, and it also comprises an arrangement 26' for introducing compressed air, again towards one or more channels in said mould base 1.

This sole plate 29 can be directly associated with the mould base 1 or, as represented in FIG. 1, can receive a part which acts as a spacer, said spacer 31 being placed between said sole plate 29 and the mould base 1.

The washer 19 which acts to lock the nut 14 is placed between said nut 14 and the collar 20 of the male part, said collar 20 either being part of the mould base 1 or of the sole plate 29, said sole plate 29 being associated with said mould base 1 or with its spacer 31, depending on the case.

It is possible to tighten the nut 14 because of the immobilization of the screw 15, said screw 15 being held in place by a series of elements which ends at the bracket 6, meaning on the frame of the mould carrier unit. This series of elements which runs from the screw 15 to the bracket 6 comprises, in order, the pin 18, the rod 12 of the actuating cylinder 11, the piston 32 of said actuating cylinder 11, and conduits 33 which are solidly connected to said piston 32 and which slide in the cover 34 of said actuating cylinder 11. This original design of the support is described in patent application PCT/FR2010/050909.

The assembly system, meaning the nut 14 and the screw 15, fits into a recess 35 delimited by the wear ring 5 and by the wall 36 of the actuating cylinder 11 which is traversed by the rod 12, said recess 35 accommodating said assembly system during the movements of the mould base 1.

The stroke of the rod 12 of the actuating cylinder 11 can advantageously be adjusted by means of a system of shims as is apparent in FIG. 1.

Thus, a shim 40 in the form of a washer is positioned so as to add thickness to the wear ring 5, on its free upper surface, and another shim 41 is installed on a shoulder 42 which may be arranged directly on the mould base 1 or, as represented in FIG. 1, on the spacer 31 which is placed between the sole plate 29 and said mould base 1.

This system of shims 40, 41 allows adjusting, by the thickness of the shims 40 and 41, the stroke of the rod 12 of the actuating cylinder 11, and in particular it allows adjusting the movement of the mould base 1 so as to control the stroke of this base 1. By controlling the stroke of the rod 12 of the actuating cylinder 11, the time needed to perform the boxing operation is optimized and the boxing cycle and manufacturing cycle for the bottle is optimized.

As an example, one can have a maximum stroke of 20 mm for the mould base 1, without using shims, and have a stroke, adjusted as required and as desired, chosen by an appropriate choice of thickness of the shims 40 and 41 used.

The shim 41 is in the form of a segment, for example, or an actual washer; it can be made of thermoplastic material to act as a damping pad in order to absorb impacts during the movement of the rod 12 of the actuating cylinder, particularly impacts when said rod 12 retracts. This shim 41 is, for example, attached by screw 43 to the shoulder 42 of the spacer 31 which constitutes one of the elements of the male part of the assembly system.

The shim 40 is attached by screw 44 to the ring 5 or directly to the actuating cylinder 11, and it is centered on said ring 5 by an inner collar 45.

The invention claimed is:

1. A support for a moulding portion of a mould base cooperating with half-moulds of a moulding unit to shape a container of thermoplastic material, said support comprising:
    an actuating cylinder including a rod solidly connected to said mould base and a body locked onto the half-moulds of said moulding unit,
    a carriage placed between said actuating cylinder and a bracket of said moulding unit, and,
    an assembly system between said rod of the actuating cylinder and said mould base,
    wherein the assembly system comprises a female part in the form of a nut, and a male part in the form of a screw;
    wherein the screw is associated directly or indirectly with the mould base; and
    wherein the screw is rotationally locked relative to an end of the rod by means of a pin which is placed between the screw and the end of the rod.

2. A support for a moulding portion of a mould base cooperating with half-moulds of a moulding unit to shape a container of thermoplastic material, said support comprising:
    an actuating cylinder including a rod solidly connected to said mould base and a body locked onto the half-moulds of said moulding unit,
    a carriage placed between said actuating cylinder and a bracket of said moulding unit, and
    an assembly system between said rod of the actuating cylinder and said mould base;
    wherein the assembly system comprises a female part in the form of a nut, and a male part in the form of a screw;
    wherein the screw is associated directly or indirectly with the mould base; and
    wherein the end of the rod of the actuating cylinder comprises means for centering and immobilizing the male part of the assembly system, said means comprising a protruding annular ring and an off-centered locking pin, and wherein the male part comprises a circular groove cooperating with the inside surface of said annular ring and an opening arranged in a manner appropriate for cooperating with said pin.

3. A support according to claim 1, said support comprising a wear ring which is solidly connected to the body of the actuating cylinder, said wear ring forming, with an exit wall of the rod of said actuating cylinder, a recess which serves to house the assembly system when said rod of said actuating cylinder is in the retracted position, and wherein said support comprises a system of shim(s) which allows adjusting a working stroke of said rod of said actuating cylinder according to requirements, said system of shim(s) being accommodated in a space which extends between said wear ring and a shoulder arranged on the male part of said assembly system.

4. A support according to claim 3, wherein the system of shim(s) comprises:
    a first shim in washer form, arranged for attachment to a free portion of the wear ring so as to add additional thickness, and a second shim arranged for attachment to said shoulder of the male part of the assembly system.

5. A support according to claim 4, wherein the second shim acts as a damping washer or pad, said second shim being made of polyurethane-type material and being attached by a screw to the shoulder of the male part of the assembly system.

6. A support according to claim 1, wherein the screw constituting the male part of the assembly system is formed directly on a free surface of the mould base.

7. A support according to claim 1, wherein the screw constituting the male part of the assembly system is formed on a sole plate which acts as an interface between said male part and, depending on the case, the mould base or a spacer which is placed between said sole plate and said mould base.

8. A support according to claim 7, wherein the sole plate, which acts as an interface, comprises arrangements in the form of channels, for distributing a heat transfer fluid into the mould base or an arrangement for supplying the air to assist with unmoulding.

9. A support according to claim 1, wherein the nut is a captive nut at the end of the rod of the actuating cylinder.

10. A support according to claim 1, wherein said support comprises a shim system arranged between a ring solidly connected to the body of the actuating cylinder and a spacer solidly connected to the mould base.

11. A support for a moulding portion of a mould base cooperating with half-moulds of a moulding unit to shape a container of thermoplastic material, said support comprising:
 an actuating cylinder including a rod solidly connected to said mould base and a body locked onto the half-moulds of said moulding unit,
 a carriage placed between said actuating cylinder and a bracket of said moulding unit, and
 an assembly system between said rod of the actuating cylinder and said mould base;
 wherein the assembly system comprises a female part in the form of a nut, and a male part in the form of a screw; and
 wherein the male part which constitutes the screw comprises a collar which extends around said screw, said collar being arranged to accept a washer, of a nylon-type material, which is placed between said collar and the nut in order to act as a locking washer.

12. A support according to claim 11, wherein the washer is solidly connected to said collar of the male part, meaning to the mould base, or, depending on the case, to the sole plate which is associated with said mould base or with the spacer.

13. A sub-assembly of a moulding unit for forming a container of thermoplastic material, comprising:
 a mould base including the moulding portion of the moulding unit intended for moulding the base of the container, and
 a support according to claim 1.

14. The support according to claim 2, said support comprising a wear ring which is solidly connected to the body of the actuating cylinder, said wear ring forming, with an exit wall of the rod of said actuating cylinder, a recess which serves to house the assembly system when said rod of said actuating cylinder is in the retracted position, and wherein said support comprises a system of shim(s) which allows adjusting a working stroke of said rod of said actuating cylinder according to requirements, said system of shim(s) being accommodated in a space which extends between said wear ring and a shoulder arranged on the male part of said assembly system.

15. The support according to claim 14, wherein the system of shim(s) comprises:
 a first shim in washer form, arranged for attachment to a free portion of the wear ring so as to add additional thickness, and a second shim arranged for attachment to said shoulder of the male part of the assembly system.

16. The support according to claim 15, wherein the second shim acts as a damping washer or pad, said second shim being made of polyurethane-type material and being attached by a screw to the shoulder of the male part of the assembly system.

17. The support according to claim 2, wherein the screw constituting the male part of the assembly system is formed directly on a free surface of the mould base.

18. The support according to claim 2, wherein the screw constituting the male part of the assembly system is formed on a sole plate which acts as an interface between said male part and, depending on the case, the mould base or a spacer which is placed between said sole plate and said mould base.

19. The support according to claim 18, wherein the sole plate, which acts as an interface, comprises arrangements in the form of channels, for distributing a heat transfer fluid into the mould base or an arrangement for supplying the air to assist with unmoulding.

20. The support according to claim 2, wherein the nut is a captive nut at the end of the rod of the actuating cylinder.

21. A support according to claim 2, wherein said support comprises a shim system arranged between a ring solidly connected to the body of the actuating cylinder and a spacer solidly connected to the mould base.

* * * * *